United States Patent
Sterman-Kabrt et al.

(10) Patent No.: US 10,630,694 B1
(45) Date of Patent: Apr. 21, 2020

(54) SYSTEMS AND METHODS FOR DATA ACCESS CONTROL

(71) Applicant: Express Scripts Strategic Development, Inc., St. Louis, MO (US)

(72) Inventors: Leah Sterman-Kabrt, West Caldwell, NJ (US); Melissa Orlando, Saint Ann, MO (US); Laurie Littlecreek, Foristell, MO (US); Corinne Bradley-Pollack, Hillsboro, MO (US); David Hutchison, Collinsville, IL (US); Kevin Mulligan, Minneapolis, MN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 196 days.

(21) Appl. No.: 15/709,597

(22) Filed: Sep. 20, 2017

Related U.S. Application Data

(60) Provisional application No. 62/397,331, filed on Sep. 20, 2016.

(51) Int. Cl.
*H04L 29/06* (2006.01)
*G06F 21/62* (2013.01)

(52) U.S. Cl.
CPC ........ *H04L 63/105* (2013.01); *G06F 21/6245* (2013.01); *G06F 2221/2141* (2013.01)

(58) Field of Classification Search
CPC ........................ H04L 63/105; G06F 2221/2141
See application file for complete search history.

(56) References Cited

U.S. PATENT DOCUMENTS

| | | | |
|---|---|---|---|
| 6,584,454 B1 | 6/2003 | Hummel, Jr. et al. | |
| 6,947,989 B2 | 9/2005 | Gullotta et al. | |
| 7,260,555 B2 | 8/2007 | Rossmann et al. | |
| 8,108,914 B2 | 1/2012 | Hernoud et al. | |
| 8,539,557 B1* | 9/2013 | Buckner | G06F 21/31 726/4 |
| 8,606,611 B1* | 12/2013 | Fedorov | G06Q 10/06 705/7.13 |
| 8,612,590 B1 | 12/2013 | Chaddha et al. | |
| 8,893,293 B1* | 11/2014 | Schmoyer | H04L 63/0807 726/26 |
| 9,213,805 B2 | 12/2015 | Motoyama | |
| 9,635,029 B2* | 4/2017 | Staggs | H04L 63/105 |

(Continued)

OTHER PUBLICATIONS

Cristea, D., Prostean, O., Muschalik, T. and Tirian, O., Feb. 2010, Distributed system for access control to physical resources based on qualifications. In Proceedings of the 9th WSEAS international conference on Software engineering, parallel and distributed systems (pp. 201-204). (Year: 2010).*

*Primary Examiner* — James R Turchen
(74) *Attorney, Agent, or Firm* — Small Patent Law Group LLC

(57) ABSTRACT

A method includes receiving an access feature request for utilization of a feature in a computing system, determining a system requestor associated with the access feature request, determining an achievement associated with the feature, accessing a plurality of first document types associated with the system requestor, determining that a document of the plurality of first document types reflects successful completion of the achievement, and providing a system access to the feature based on a determination that the document reflects successful completion of the achievement.

18 Claims, 9 Drawing Sheets

| Training Achievement | Access Level |
|---|---|
| A | 10 |
| B | 9 |
| C | 8 |
| D | 7 |
| E | 6 |
| F | 5 |
| G | 4 |
| H | 3 |
| I | 2 |
| J | 1 |

(56) References Cited

U.S. PATENT DOCUMENTS

| | | | |
|---|---|---|---|
| 9,990,636 B1* | 6/2018 | Lewis | G06Q 30/016 |
| 2004/0241627 A1* | 12/2004 | Delfing | G06Q 10/10 |
| | | | 434/219 |
| 2005/0188267 A1* | 8/2005 | Farchmin | G05B 19/4184 |
| | | | 714/35 |
| 2006/0160059 A1* | 7/2006 | Dompier | G06Q 10/10 |
| | | | 434/362 |
| 2010/0042511 A1* | 2/2010 | Sundaresan | G06Q 30/0601 |
| | | | 705/26.1 |
| 2011/0313782 A1* | 12/2011 | DeMeyer | G06Q 10/06 |
| | | | 705/2 |
| 2012/0216179 A1 | 8/2012 | Sharma et al. | |
| 2012/0254048 A1* | 10/2012 | Roberts | G06Q 10/06 |
| | | | 705/317 |
| 2013/0103749 A1* | 4/2013 | Werth | G06F 9/5072 |
| | | | 709/203 |
| 2013/0132122 A1 | 5/2013 | Walsh et al. | |
| 2013/0198799 A1* | 8/2013 | Staggs | H04L 63/105 |
| | | | 726/1 |
| 2013/0204641 A1* | 8/2013 | Shah | G06Q 50/24 |
| | | | 705/3 |
| 2013/0268357 A1 | 10/2013 | Heath | |
| 2013/0325704 A1* | 12/2013 | Gorman | G06Q 50/265 |
| | | | 705/39 |
| 2014/0081648 A1 | 3/2014 | Mabry et al. | |
| 2014/0136216 A1 | 5/2014 | Beebe et al. | |
| 2014/0149133 A1 | 5/2014 | Gibby et al. | |
| 2014/0196104 A1* | 7/2014 | Chari | H04L 63/20 |
| | | | 726/1 |
| 2014/0222684 A1* | 8/2014 | Felsher | G06F 19/328 |
| | | | 705/50 |
| 2014/0249849 A1 | 9/2014 | Khare et al. | |
| 2015/0066250 A1* | 3/2015 | Garzella | G09B 19/00 |
| | | | 701/3 |
| 2015/0149211 A1 | 5/2015 | Ohad et al. | |
| 2015/0235183 A1* | 8/2015 | Sampson | G06Q 10/1095 |
| | | | 705/7.19 |
| 2015/0242579 A1 | 8/2015 | Walmer et al. | |
| 2016/0014133 A1 | 1/2016 | Kanga et al. | |
| 2016/0065585 A1 | 3/2016 | Della Corte et al. | |
| 2016/0103978 A1 | 4/2016 | Stong | |
| 2017/0359245 A1* | 12/2017 | Dintenfass | H04L 41/147 |
| 2017/0359351 A1* | 12/2017 | Dintenfass | H04L 63/105 |
| 2018/0069866 A1* | 3/2018 | Chalmers | H04L 63/1433 |

* cited by examiner

| Training Achievement | Access Level |
|---|---|
| A | 10 |
| B | 9 |
| C | 8 |
| D | 7 |
| E | 6 |
| F | 5 |
| G | 4 |
| H | 3 |
| I | 2 |
| J | 1 |

FIGURE 3

| Operator | Access Level | Privileges |
|---|---|---|
| CRC1115927 | 1 | View AB |
| JRC0627261 | 4 | Process TOR B; Process TOR A; Report ABC; View AB |
| EJC0427771 | 6 | QR TOR A; QR TOR B; Process TOR C; Process TOR B; Process TOR A; Report ABC; View A |
| MRR0526876 | 3 | Process TOR A; Report ABC; View AB |
| RLC1324681 | 10 | QR TOR E; QR TOR G; TOR H; QR TOR D; QR TOR F; TOR D; TOR E; TOR F; TOR G; QR TOR |
| JLL9353456 | 9 | QR TOR D; QR TOR F; TOR D; TOR E; TOR F; TOR G; QR TOR C; QR TOR A; QR TOR B; Proc |

FIGURE 5

SYSTEMS AND METHODS FOR DATA ACCESS CONTROL

CROSS-REFERENCE TO RELATED APPLICATIONS

This application claims priority to U.S. Provisional Application No. 62/397,331, which was filed on 20 Sep. 2016, and the entire disclosure of which is incorporated herein by reference.

FIELD

The present disclosure relates generally to the technical field of data processing. In a specific example, the present disclosure may relate to systems and methods for controlling access to and modification of data, which may include establishing multiple levels of data access.

BACKGROUND

The access to and use of data and associated logic by an organization presents challenges. Certain data, when erroneously modified, can cause processing logic to behave in an undesirable way. When this occurs, debugging or other operations may need to be performed to determine the source of the error, the impact of the error, and correct the error.

For example, a large amount of data and logic may be used to determine which pharmacies can process and fill the prescriptions and prescription orders, and how the prescriptions and prescription orders are processed and filled by the pharmacies. This data and logic can be extensive and complex due to the vast amount of pharmacies and other providers, as well as the arrangements for which pharmacies and other providers are permitted to process and fill prescriptions and prescription orders for many different purchasers having a large amount of different insurance plans.

BRIEF SUMMARY

In one embodiment, a method includes receiving an access feature request for utilization of a feature in a computing system, determining a system requestor associated with the access feature request, determining an achievement associated with the feature, accessing a plurality of first document types associated with the system requestor, determining that a document of the plurality of first document types reflects successful completion of the achievement, and providing a system access to the feature based on a determination that the document reflects successful completion of the achievement.

In one embodiment, a method includes determining a training achievement of a system requestor attempting to access one or more computer memories storing information, the training achievement represents one or more types of training or an amount of training performed by the system requestor, determining a data access level associated with the training achievement of the system requestor from a plurality data access levels that dictate different operations on the information stored in the one or more computer memories, and granting an access to the system requestor to at least some of the information stored on the one or more computer memories according to the level of data access associated with the training achievement of the system requestor.

In one embodiment, a tangible and non-transitory computer-readable storage medium includes a plurality of instructions that direct at least one processor to receive an access feature request for utilization of a feature in a computing system, determine a system requestor associated with the access feature request, determine an achievement associated with the feature, access a plurality of first document types associated with the system requestor, determine that a document of the plurality of first document types reflects successful completion of the achievement, and provide a system access to the feature based on a determination that the document reflects successful completion of the achievement.

BRIEF DESCRIPTION OF THE DRAWINGS

The present disclosure will become more fully understood from the detailed description and the accompanying drawings.

FIG. 3 illustrates one example of a data structure representative of access level data according to one example embodiment;

FIG. 5 illustrates one example of a data structure representative of a combination of the training data, the access level data, and the privileges data according to one example embodiment;

In the drawings, reference numbers may be reused to identify similar and/or identical elements.

DETAILED DESCRIPTION

Figure 1:
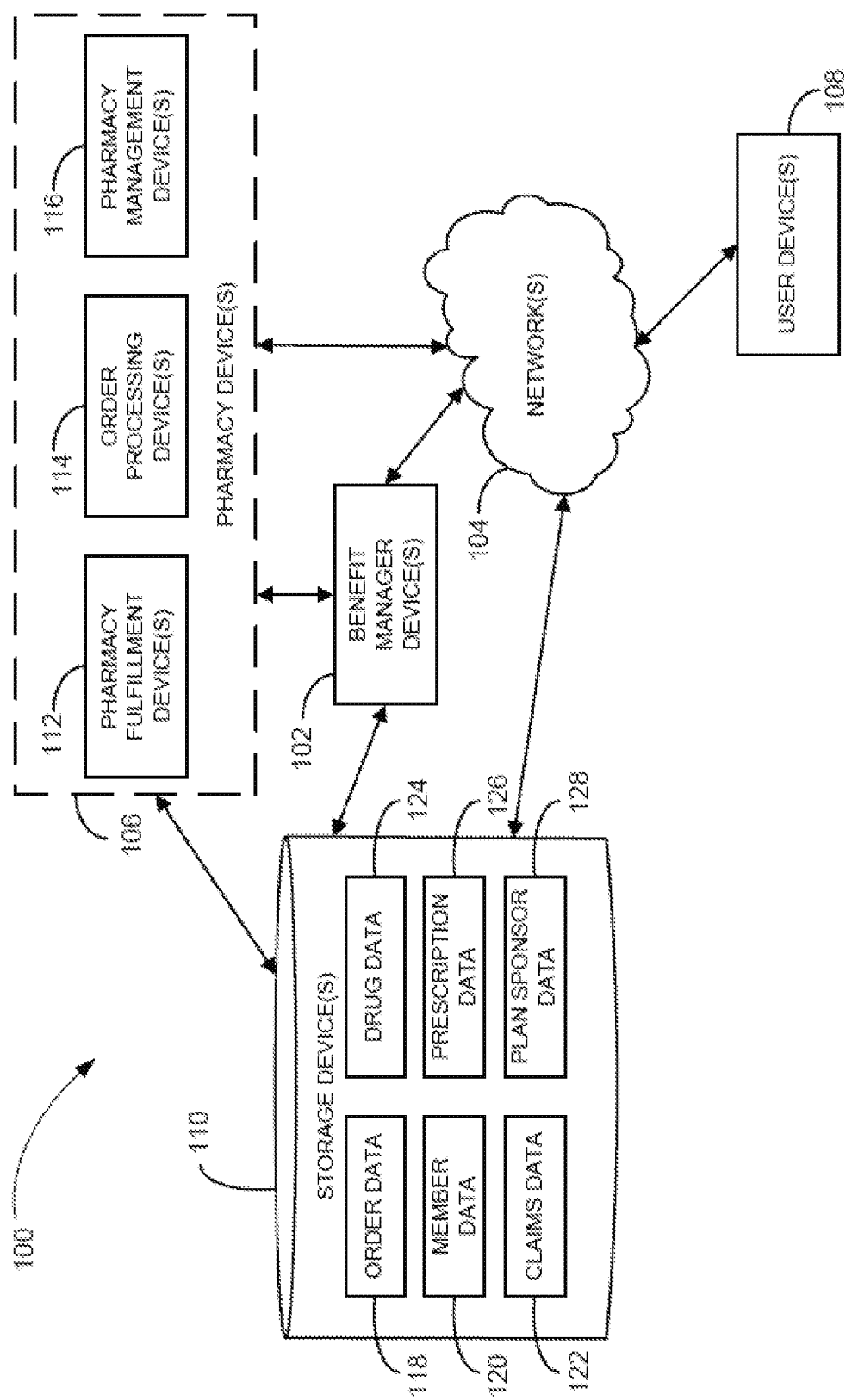
FIG. 1 is a diagram of an example implementation of a system for a pharmacy, according to an example embodiment.

Example systems and methods for controlling access and modification to data used are described. In the following description, for purposes of explanation, numerous specific details are set forth in order to provide a thorough understanding of example embodiments. It will be evident, however, to one of ordinary skill in the art that these embodiments may be practiced without these specific details.

Creation and/or modifications to data that relies on logic to determine which pharmacies can process and fill the prescriptions and prescription orders, and how the prescriptions and prescription orders are processed and filled by the pharmacies can have wide-ranging implications on the processing and filling of the prescriptions and prescription orders.

Due to the large amount and complexity of the data and logic, operators utilizing a system have access to the data but that lack the training needed to create or modify some of the data can pose a significant risk to the proper management and operation of the information. In some embodiments, such risk can include the ability of pharmacies and other providers to process and fill prescriptions and prescription orders. These operators optionally can be referred to as system requestors as the system requestors are requesting access to the computing system and/or data of the computing system to perform various tasks or operations.

For those system requestors having sufficient training and expertise to modify or otherwise process the information, tasks requiring the system requestors to modify or process data can be assigned to the system requestors. But, in large organizations having many system requestors with various levels of skill and expertise, it can be difficult to know which system requestors have sufficient training or expertise, as well as time, to complete tasks being assigned to the system requestors. This can result in some qualified system requestors being overloaded with tasks to complete and/or not being utilized efficiently to perform the tasks.

In some embodiments, the methods and systems enable appropriate access and usage to a computing system. In some embodiments, the access and usage involves the modification of data and logic associated with the system data processing logic. In some embodiments, the system data processing logic includes logic to enable processing of prescription drug claim adjudication received from a pharmacy.

In some embodiments, all system requestors of the methods and systems do not have edit rights with the ability to access and modify any part data, regardless of the understanding, knowledge, or training of the particular functions, fields, or other portions of the information. In some embodiments, the methods and systems provide transitional access to mirror a changing skill set of a system requestor, the level of complexity mastered by the system requestor, and/or the quality of the output generated by the system requestor. Once a system requestor has access to the data implemented by the logic, the system requestor may be assessed to determine what transitional level (also referred to as an access level or level of access) within a range of different transitional or access levels should be assigned to the system requestor. The access level may be determined based on an amount, type, and/or level of training (e.g., educational training) that the system requestor has received or completed. The access level associated with each system requestor can be changed at any time, such as by a manager or supervisor responsive to the system requestor completing one or more training exercises (e.g., courses, exams, or the like). This can allow for the attributes of access levels to be quickly and easily changed, such as by changing without requiring intervention or involvement of specialized technicians, such as persons of an information technology (IT) staff.

In some embodiments, the system requestor may be able to complete tasks, also referred to as types of requests (also referred to as TORs or work requests), using the data and/or logic for handling the data to which the system requestor has access. The types of requests may involve the system requestor changing which pharmacies or other providers can be used by a consumer having an insurance plan to process and fill prescriptions and prescription orders, changing details of the pharmacies or other providers (e.g., addresses and suspensions from insurance plans), adding pharmacies or other providers to insurance plans, or the like. The different types of requests available for performance by the system requestors are segmented so that only certain access levels have the ability to complete certain types of requests. The more complex and risk adverse types of requests require a greater access level (and thus require a more skilled and experienced system requestor). The less complex or less risk adverse types of requests may require smaller access levels to allow for less skilled or experienced system requestors to complete the types of requests. The assignment of types of requests to different access levels can be modified to balance workflow among the range of access levels in a workforce of system requestors. The different access levels also can reflect when a system requestor is able to perform quality review (QR) of the work of other system requestors on certain types of requests.

FIG. 1 is a block diagram of an example implementation of a system 100 for a pharmacy, according to an example embodiment. The system 100 is an example environment in which the methods and systems for data access control may be implemented. However, the methods and systems may be implemented in data processing environment that is not associated pharmacy technology. For example, the methods and systems may be used to provide data access control for a research system, a payroll system, a computer programming environment, an intelligence dissemination system, a finance or banking system, telephone call centers, insurance claim processing (e.g., for health insurance, automotive insurance, or other insurance), hospital administration and related activities, factory operations, etc.

While the system 100 is generally described as being deployed in a high-volume pharmacy or a fulfillment center (e.g., a mail order pharmacy, a direct delivery pharmacy, etc., and the like), the system 100 and/or components thereof may otherwise be deployed (e.g., in a lower volume pharmacy, etc.). A high-volume pharmacy may be a pharmacy that is capable of filling prescriptions automatically, mechanically, manually, or a combination thereof. The system 100 may include a benefit manager device 102, a pharmacy device 106, and a user device 108 in communicating with each other directly and/or over a network 104. The system may also include a storage device 110.

The benefit manager device 102 is a device operated by an entity that is at least partially responsible for creation and/or management of the pharmacy or drug benefit. While such entity operating the benefit manager device 102 is typically a pharmacy benefit manager (PBM), other entities may operate the benefit manager device 102 on behalf of themselves (i.e., the pharmacy benefit managers) or other entities. For example, the benefit manager device 102 may be operated by a health plan, a retail pharmacy chain, a drug wholesaler, a data analytics, or other type of software-related company, etc., or the like. In some embodiments, a pharmacy benefit manager that provides the pharmacy benefit may also provide one or more than one additional benefits including a medical or health benefit, a dental benefit, a vision benefit, a wellness benefit, a radiology benefit, a pet care benefit, an insurance benefit, a long-term care benefit, a nursing home benefit, etc., and the like. The pharmacy benefit manager may, in addition to its pharmacy benefit manager operations, operate one or more than one pharmacies. The pharmacies may be retail pharmacies, mail order pharmacies, etc.

Some of the operations of the pharmacy benefit manager that operates the benefit manager device 102 may include the following activities and processes. A member (or a person on behalf of the member) of a pharmacy benefit plan may obtain a prescription drug at a retail pharmacy location (e.g., a location of a physical store, etc.) from a pharmacist or a pharmacist technician. The member may also obtain the prescription drug through mail order drug delivery from a mail order pharmacy location, which may be the pharmacy system 100. In some embodiments, the member may obtain the prescription drug directly or indirectly through the use of a machine, such as a kiosk, vending unit, mobile electronic device, or a different type of mechanical, electrical, electronic communication device and/or computing device. Such a machine may be filled with the prescription drug in prescription packaging, which may include multiple prescription components, by the high-volume pharmacy system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, etc., or the like. In some instances, an employer of the member may directly or indirectly fund or reimburse the member for the copayments.

The amount of the copayment required by the member may vary with different pharmacy benefit plans having different plan sponsors or clients and/or for different prescription drugs. The member's copayment may be a flat copayment (e.g., $10, etc.), co-insurance (e.g., 10%, etc.), and/or a deductible (e.g., for first $500 of annual prescription drug expense, etc.) for certain prescription drugs, certain types and/or classes of prescription drugs, and/or all prescription drugs. The copayment may be stored in the storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels used for the prescription drug to be received. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the pharmacy benefit manager for the prescription drug. After receiving the claim, the pharmacy benefit manager, e.g., the benefit manager device, may perform certain adjudication operations including verifying eligibility for the member, identifying/reviewing an applicable formulary for the member to determine any appropriate copayment, coinsurance, and deductible for the prescription drug, and performing a drug utilization review (DUR) on the member. Further, the pharmacy benefit manager may provide a response to the pharmacy, e.g., the pharmacy system 100, following performance of at least some of the aforementioned operations.

As part of the adjudication, a plan sponsor (or the pharmacy benefit manager on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances, these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on types of pharmacy network in which the pharmacy is included. In some embodiments, the amount may also be determined based on other factors. For example, if the member pays the pharmacy for the prescription drug without using the prescription or drug benefit provided by the pharmacy benefit manager, the amount of money paid by the member may be higher than when the member uses the prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a Wi-Fi network, or an IEEE 802.11 standards network, as well as various combinations thereof. The network 104 may include optical network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Va.

Moreover, although the system shows a single network 104, multiple networks can be used. The multiple networks may communicate in series with each other to link the devices 102, 106-110 or in parallel to link the devices 102, 106-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy device 106 may be utilized by the pharmacy to submit the claim to the pharmacy benefit manager for adjudication.

Additionally, in some embodiments, the pharmacy device 106 may enable information exchange between the pharmacy and the pharmacy benefit manager, for example, to allow the sharing of member information such as drug history, and the like, that may allow the pharmacy to better service a member (e.g., by providing more informed therapy consultation and drug interaction information, etc.). In some embodiments, the benefit manager device 102 may track prescription drug fulfillment and/or other information for patients that are not members or have not identified themselves as members, at the time (or in conjunction with the time) in which they seek to have a prescription filled at a pharmacy.

The pharmacy device 106 may include an order processing device 114, a pharmacy management device 116, and a pharmacy fulfillment device 112 in communication with each other directly and/or over the network 104.

The order processing device 114 may receive information regarding filling prescriptions and may direct an order component to one or more devices of the pharmacy fulfillment device 112 at a pharmacy. The fulfillment device 112 may fulfill, dispense, aggregate, and/or pack the order components of the prescription drugs in accordance with one or more prescription orders directed by the order processing device 114. The order processing device 114 may be deployed in the system 100, or may otherwise be used.

In general, the order processing device 114 is a device located within or otherwise associated with the pharmacy to enable fulfillment of a prescription and dispensing prescription drugs by the fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

Generally, a prescription order is generated for a high-volume pharmacy. The prescription order may include more than one prescription drug for fulfillment. Each prescription drug in a prescription order is an order component of the prescription order. Generally, the order components are pill bottles, liquid bottles, blister packs, unit-of-use packs, injectable package, spray bottles, tubes, ampoules, drop counters, insulated boxes, child-resistant containers, or other packaging having a quantity of a prescription drug contained therein.

In some embodiments, the order processing device 114 may operate in combination with the pharmacy management device 116.

The order processing device 114 may include circuitry, a processor, a memory to store data and instructions, and communication functionality. The order processing device 114 is dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage, etc.) and/or through the network 104 (e.g., by utilizing a cloud configuration or software as a service. etc.) with the storage 110.

The user device 108 is used by a device system requestor. The device system requestor may be a user (e.g., an employee, a contractor, a benefit member, etc.) associated with a software development project. Other device system requestors may also operate the user device 108.

The user device 108 may be a stand-alone device that solely provides at least some of the functionality of the methods and systems, or may be a multi-use device that has functionality outside of the methods and systems. Examples of the user device 108 include a set-top box (STB), a receiver card, a mobile telephone, a personal digital assistant (PDA), a display device, a portable gaming unit, and a computing system, etc. Other devices, however, may also be used. In some embodiments, the computing system may include a mobile computing device. For example, the user device 108 may include a mobile electronic device, such an iPhone or iPad by Apple, Inc., mobile electronic devices powered by Android by Google, Inc., and a Blackberry by BlackBerry Limited. The user device 108 may also include other computing devices, such as desktop computing devices, notebook computing devices, netbook computing devices, gaming devices, and the like. Other types of electronic devices may also be used.

The storage device 110 may include: a non-transitory storage (e.g., memory, hard disk, CD-ROM, etc.) in communication with the benefit manager device 102, the pharmacy device 106, and/or the user device 108 directly and/or over the network 104. The non-transitory storage may store pricing data 118, restriction data 120, claims data 122, drug data 124, pharmacy data 126, and/or plan sponsor data 128. Further, the system 100 may include additional devices, which may communicate with each other directly or over the network 104.

The pricing data 118 may include information indicative of different prices to be charged for various medications. The pricing information may include electronic information regarding financial outlays or costs for various medications sold by pharmaceutical providers.

The restriction data 120 includes information regarding limitations on what medications can be sold or otherwise dispensed to members by pharmaceutical providers. The information stored as restriction data 120 may include limitations on which medications can be sold, how much of particular medications can be sold, how frequently medications can be sold, and the like.

The claims data 122 includes information regarding pharmacy claims adjudicated by the pharmacy benefit manager under a drug benefit program provided by the pharmacy benefit manager for one, or more than one, plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic produce identifier (GPI) number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other type of health care-related claims for members may be stored as a portion of the claims data 122.

In some embodiments, the claims data 122 includes claims that identify the members with whom the claims are associated. In some embodiments, the claims data 122 includes claims that have been de-identified (e.g., associated with a unique identifier but not with a particular, identifiable member, etc.), aggregated, or otherwise processed.

The drug data 124 may include drug name (e.g., technical name and/or common name, etc.), other names by which the drug is known by, active ingredients, an image of the drug (e.g., in pill form, etc.), and the like. The drug data 124 may include information associated with a single medication or multiple medications.

The pharmacy data 126 may include information regarding variously pharmaceutical providers that provide or otherwise dispense medications to patients. Examples of the pharmacy data 126 include pharmacy names and/or addresses, suspensions of pharmacies, networks to which the pharmacies belong, and the like.

The plan sponsor data 128 includes information regarding the plan sponsors of the pharmacy benefit manager. Examples of the plan sponsor data 128 include company name, company address, contact name, contact telephone number, contact e-mail address, etc., and the like.

Figure 2:
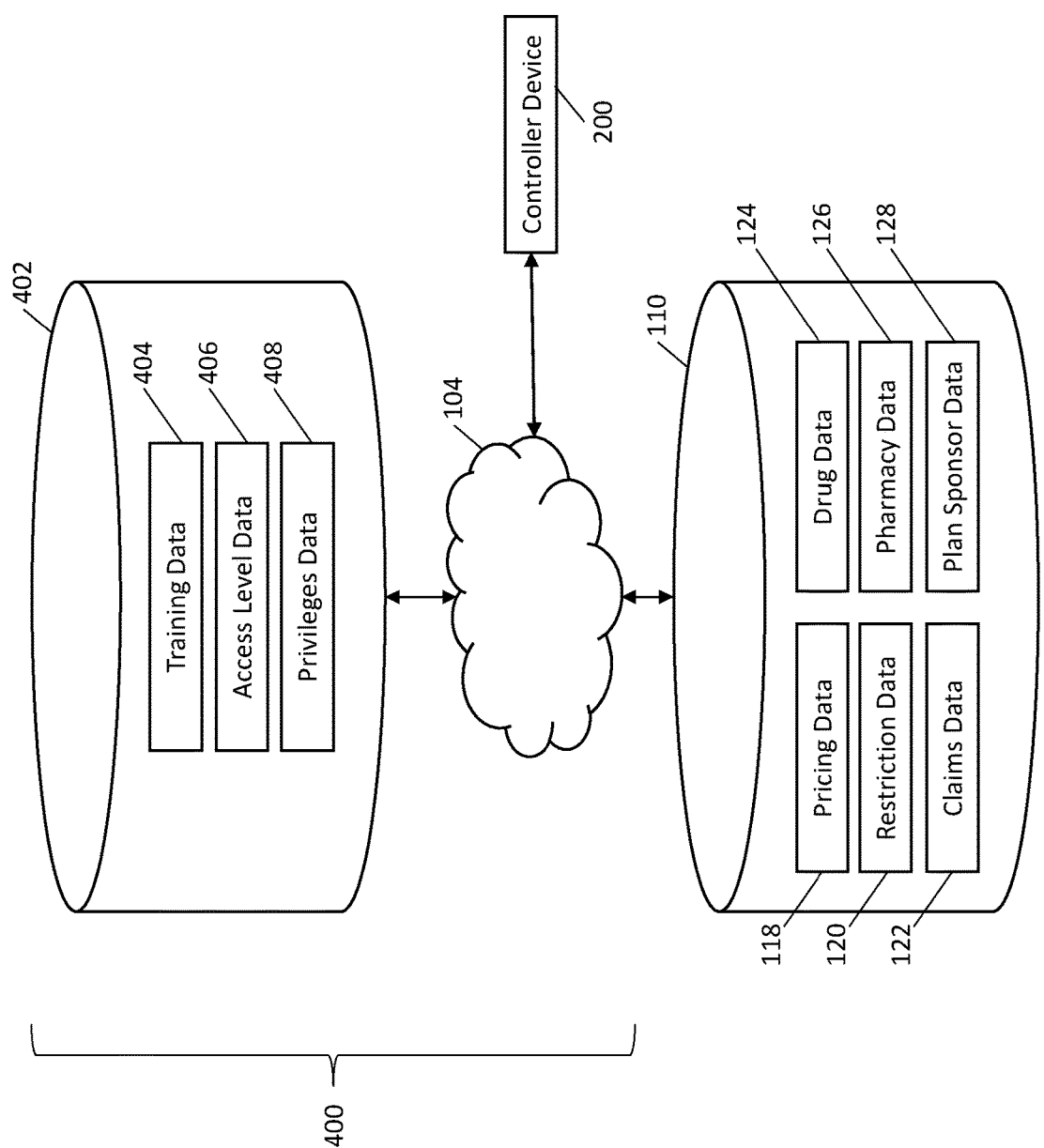
FIG. 2 is a block diagram of an example implementation of a system for controlling access to and modification of data for a pharmacy benefit manager, according to an example embodiment.

FIG. 2 is a block diagram of an example implementation of a system 400 for controlling access to and modification of data for a pharmacy benefit manager, according to an example embodiment. While the system 400 is generally described as being deployed for use in controlling access to and modification of data used by a pharmacy benefit manager in connection with pharmacies, prescribers, clinics, or other types of fulfillment centers, the system 400 and/or components thereof may otherwise be deployed.

The system 400 includes a controller device 200 that represents hardware circuitry that includes and/or is connected with one or more than one processor (e.g., microprocessors, field programmable gate arrays, integrated circuits, or the like) that operate to determine whether various system requestors (e.g., system requestors of the benefit manager devices 102 shown in FIG. 1) are to have system access to and/or the ability to utilize various features in the computing system 400. The features can involve viewing, modifying, or otherwise processing portions of the restriction data 120, the claims data 122, the plan sponsor data 128, or other data (e.g., the pricing data 118, the drug data 124, the pharmacy data 126, or the like). The controller device 200 communicates with the storage device 110 and/or one or more additional storage devices 402 (e.g., via the network 104) to access information used to determine what data various system requestors can have access to and/or can modify, as well as to provide the system requestors with access to the data that can be viewed and/or modified by the system requestors. While the storage devices 110, 402 are shown as separate devices in FIG. 4, the storage devices 110, 402 may be combined into a single storage device, may be split among more than two storage devices 110, 402, or otherwise. In some embodiments, the storage devices 110, 402 may be deployed in memory, disk storage, or otherwise of a computer system.

The controller device 200 can receive an access feature request from a system requestor that indicates what feature or features of the computing system that the system requestor wants to utilize. This request can include a request to view, edit, or otherwise modify data stored in the computing system 400. The controller device 200 accesses a plurality of document types associated with a system requestor seeking access to data of the computing system 400. These document types can reflect achievements of the system requestor, such as trainings completed by the system requestor, an experience level of the system requestor, academic degrees obtained by the system requestor, etc. If a document of this document type indicates that the system requestor has successfully completed an achievement associated or required for the requested feature, then the computing system 400 can provide access to the system requestor into the computing system 400 to use the requested feature.

The storage device 402 stores data used to determine achievements (e.g., a role or training level) of various different system requestors, document types used to determine the levels of access associated with different achievements, and data used to determine which system features are associated with the different access levels. This data may be separately stored in different data structures or documents to allow for the quick and easy modification of which access levels are associated with which training levels and/or which privileges are associated with the different access levels. In some embodiments, without separately storing the data in this or a similar manner, modification of the access level and/or privileges for one or more system requestors can be a time-consuming, complex, and error-prone process. For example, other approaches to controlling data access involve creating many different levels of access, and manually tracking which access level that each different user is entitled to use based on the knowledge, training, experience, level, and/or skills of the different users.

Training data 404 may be stored in the additional storage device 402 and represent data structures that associate different system requestors with training achievements. In general, a training achievement represents the education, experience, or other training completed by a system requestor (e.g., as defined by an organization associated with the system requestor). In some embodiments, the training achievement is an achievement with respect to expertise in the utilization of functionality of a computing system. For example, the computer devices, software applications running the computer devices, and/or logic (e.g., rules and criteria) used by the applications can be complex and unfamiliar to those system requestors having less experience with the types of devices, applications, and/or logic (relative to system requestors having more experience). While a system requestor may have the knowledge, skill, and expertise to process or otherwise modify the information (e.g., pharmaceutical data) in other forms (e.g., paper forms), conversion of this information into data that is electronically stored and manipulated by the devices, software applications, and/or logic creates unfamiliarity in the system requestors and an initial inability of the system requestors to perform the same information processing or modification using the devices, applications, and/or logic.

Over time, however, repeated use of the devices, applications, and/or logic increases the familiarity and skill of system requestors in using the devices, applications, and/or logic. This increasing skill and familiarity can be quantitatively tied (e.g., connected or associated) with completing different training achievements.

The training achievements can represent the type and/or amount of training performed by the different system requestors. Different types of training achievements can include coursework or classroom training, online education, simulated training, lengths of time working, or the like. By way of example, a first system requestor recently hired at a pharmacy benefit manager with little to no experience working at a pharmacy benefit manager may have a first, relatively low level of training achievement, a second system requestor having several years of experience at the pharmacy benefit manager with several classes, exams, or the like, being successfully completed may have a second, greater level of training achievement, a third system requestor having many more classes, exams, or the like, being successfully completed may have a third, greater level of training achievement, and so on.

Access level data 406 may be stored in the additional storage device 402 and represent data structures that associate different training achievements with different levels of access to view and/or modify system data (such as the data 118, 120, 122, 124, 126, and/or 128). Higher or greater access levels allow system requestors to view, modify, review, and/or process (e.g., using a TOR) more of the data 118, 120, 122, 124, 126, and/or 128, while lower or smaller access levels allow system requestors to view, modify, and/or review less or none of the data 118, 120, 122, 124, 126, and/or 128. For example, a system requestor having a low access level may only be able to view some of the restriction data 120 or plan sponsor data 128, and not be able to modify the data 118, 120, 122, 124, 126, 128, may not be able to review types of requests or work requests performed by other system requestors, and/or may not be able to complete one or more (or all) types of requests or work requests.

Access level data 406 optionally may represent data structures that associate different training achievements with different levels of access to various logics, functionalities, capabilities, and/or abilities to view and/or modify system data (such as the data 118, 120, 122, 124, 126, and/or 128). Lower access levels may be restricted to fewer abilities to change data and/or to allow the data to be changed in particular ways that impacts other data. Higher or greater access levels may be allowed more abilities to change data and/or to allow the data to be changed in particular ways that impacts other data. For example, the ability to initiate a change in data that has automation behind the change (which cascades the update to thousands of locations of data) may be available to one access level but not to another, lower access level. Another example includes updates to rules or engines that are only available for certain access levels. These rules or engines can dictate which claims for pharmaceutical benefits are approved or denied.

Privileges data 408 may be stored in the additional storage device 402 and represent data structures that associate different access levels with different groups of logic and abilities to view, modify, and/or review the data 118, 120, 122, 124, 126, and/or 128. The privileges data 408 dictate the extent to which various aspects of the data 118, 120, 122, 124, 126, and/or 128 can be edited. The privileges data 408 can list or otherwise indicate which portions of the data 118, 120, 122, 124, 126, and/or 128 can be accessed by, modified, reviewed, or the like, for each of the different access levels.

FIG. 3 illustrates one example of a data structure 600 representative of the access level data 406 according to an example embodiment. While the data structure 600 is represented in FIG. 3 graphically, it should be appreciated that the data structure 600 may be implemented in a computer system (e.g., in a file allocation table and data associated therewith) in memory, drive storage, and/or cloud storage, or otherwise implemented. The data structure 600 includes several records 602 each associated with a different training level. The records 602 each include several cells 604, 606, with the cells 604 including data indicative of the different training levels and the cells 606 including data indicative of the access levels associated with the corresponding training level.

In some embodiments, the data of the cells 604, 606 of the data structure 600 is stored as binary data, hex data, or otherwise. When such data of the cells 604, 606 are ultimately displayed (e.g., to a user of the system 400), the underlying data is interpreted, translated, or otherwise processed into a human readable level identifier.

The data indicative of the access levels is shown as a single number. For example, a low access level (associated with a low level of experience and/or training) can be represented by the number one while a larger (or the largest) access level (associated with a high level of experience and/or training) can be represented by the number ten. In some embodiments, a different range of numbers can be used. While a single number is used to represent the access levels, the access levels may be represented in another manner. For example, numbers and/or sequences of numbers, letters, or other symbols may be used to indicate the different access levels.

Figure 4:
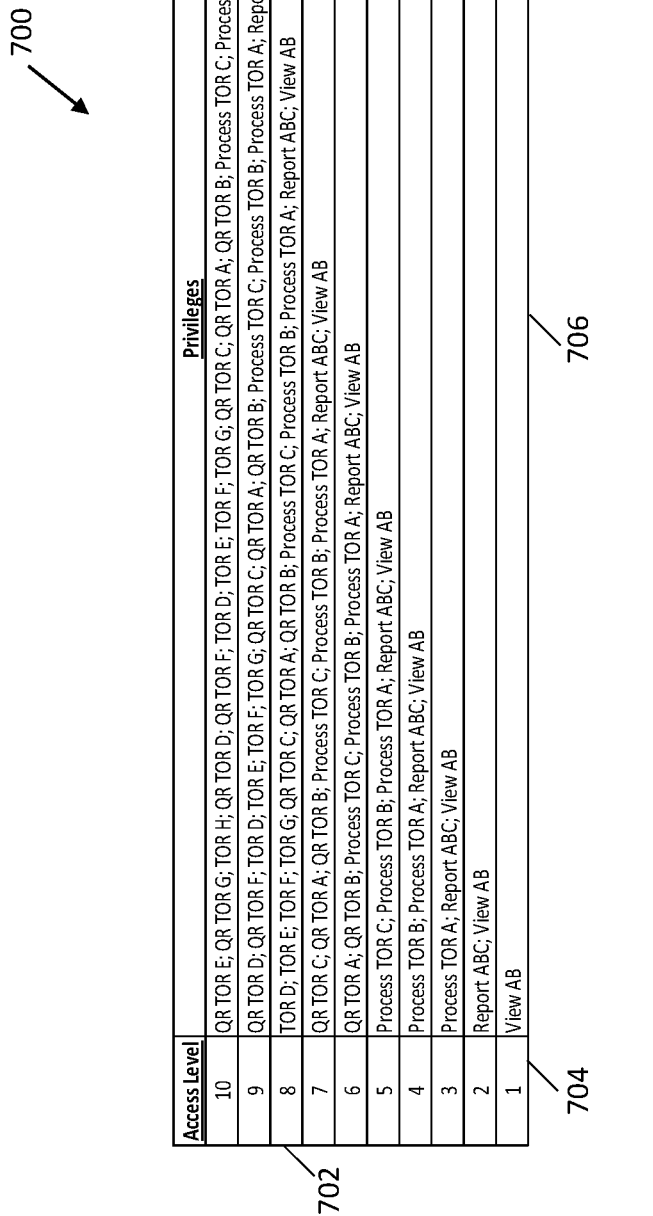
FIG. 4 illustrates one example of a data structure representative of privileges data according to one example embodiment.

FIG. 4 illustrates one example of a data structure 700 that is representative of the privileges data 408 according to one example embodiment. While the data structure 700 is represented in FIG. 4 graphically, it should be appreciated that the data structure 700 may be implemented in a computer system (e.g., in a file allocation table and data associated therewith) in memory, drive storage, and/or cloud storage, or otherwise implemented. The data structure 700 includes several records 702 each associated with a different access level. The records 702 each include several cells 704, 706, with the cells 704 including data indicative of the different access levels and the cells 706 including data indicative of the data viewing and data modifying abilities associated with the different access levels. In some embodiments, the data contained in the cells 704, 706 determines system functionality availability at particular access levels and/or access to different data elements or sets of data.

In some embodiments, the data of the cells 704, 706 of the data structure 700 is stored as binary data, hex data, or otherwise. When such data of the cells 704, 706 are ultimately displayed (e.g., to a user of the system 400), the underlying data is interpreted, translated, or otherwise processed into a human readable level identifier.

The abilities include "View AB," which indicates that the associated access levels have the permission to view AB data. The AB data can be, for example, names and addresses of pharmacies or other providers. The ability "Report ABC" indicates that the associated access levels have the permission to generate a report or other listing that includes and/or represents the ABC data. This data can include, for example, the names and addresses of pharmacies, as well as the insurance networks that include the pharmacies. The abilities "Process TOR" indicate that the corresponding access levels can complete the task represented by TOR A, TOR B, etc., as applicable. For example, TOR A may include changing the name of a pharmacy in the data 118, 120, 122, 124, 126, and/or 128, TOR B may include changing the address of a pharmacy in the data 118, 120, 122, 124, 126, and/or 128, TOR C may include changing which network includes a pharmacy, and so on. The ability "QR" indicates that the associated access level has the permission to review or perform quality review of the TOR listed after the QR indicator. For example, access level six allows a system requestor to review and modify (if needed) the data modified by TOR A or TOR B by another system requestor. In one embodiment, each access level also may include the privileges associated with all other lower access levels, but not any privilege only included in one or more higher or greater access levels.

FIG. 5 illustrates one example of a data structure 201 that is representative of a combination of the access level data 406 and the privileges data 408 according to one example embodiment. While the data structure 201 is represented in FIG. 5 graphically, it should be appreciated that the data structure 201 may be implemented in a computer system (e.g., in a file allocation table and data associated therewith) in memory, drive storage, and/or cloud storage, or otherwise implemented.

The data structure 201 includes several records 202 each associated different system requestors. The records 202 each include several of the cells 504, 606, 706 described above. For example, each record 202 includes data indicative of a different system requestor in a cell 504, data indicative of an access level associated with that training achievement in a cell 606, and data indicative of the access levels available to that training achievement in a cell 706. The data structure 201 can be formed as a combination of the data structures 600, 700 described above. The data structure 201 can be updated by modifying the data in one or more of the cells in the other data structures 600 and/or 700. The controller device 200 also may refer to the data structures 600, 700 to determine how to update the cells 606, 706 in the data structure 201. For example, the controller device 200 can refer to the data structure 600 to determine the access level to put into the cell 606 of the data structure 201 and can refer to the data structure 700 to determine the privileges to put into the cell 706 of the data structure 201.

In some embodiments, the data of the cells 504, 606, 706 of the data structure 201 is stored as binary data, hex data, or otherwise. When such data of the cells 504, 606, 706 are ultimately displayed (e.g., to a user of the system 400), the underlying data is interpreted, translated, or otherwise processed into a human readable level identifier.

Figure 6:
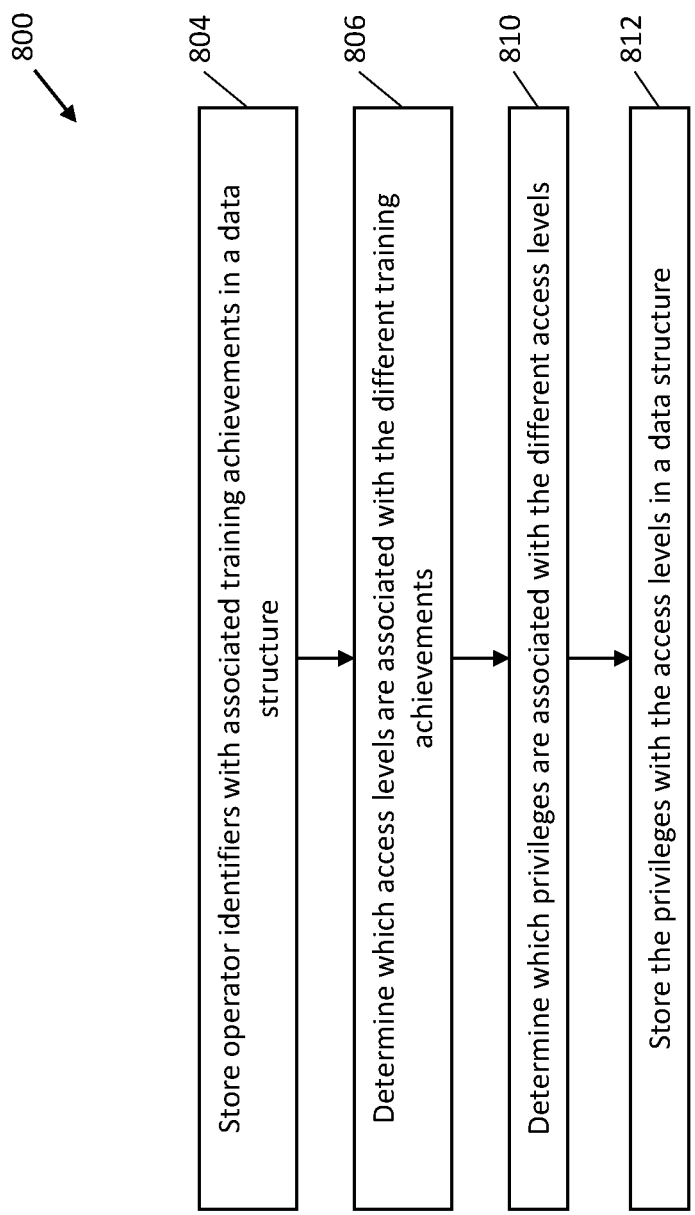
FIG. 6 is an example process flow illustrating a method for configuring data storage devices for use in controlling access to and/or modification of data according to an example embodiment.

FIG. 6 is an example process flow illustrating a method 800 for configuring data storage devices for use in controlling access to and/or modification of data according to an example embodiment. The method 800 may be used to create and/or modify the data structures 600, 700 stored in one or more of the storage devices 110, 402 described above.

At block 804, system requestor identifiers are stored in a data structure. The system requestor identifiers can be unique alpha-numeric strings that represent different system requestors. At block 806, different access levels associated with the system requestors are determined. For example, a list of training achievements needed to obtain an access level may be obtained from or provided by a system requestor of the controller device 200. Different access levels may be associated with different training achievements of the different system requestors.

At block 810, different privileges associated with the different access levels are determined. For example, a list of one or more actions that may be performed using the data 118, 120, 122, 124, 126, and/or 128, a list of one or more modifications that may be made to the data 118, 120, 122, 124, 126, and/or 128, and/or a list of one or more other permissions for the handling of the data 118, 120, 122, 124, 126, and/or 128 may be determined for each access level. The actions, modifications, and/or other permissions may be determined for each access level from selections provided by a system requestor, manager, supervisor, or another person.

At block 812, the privileges that are determined are stored in a data structure with the associated access levels. The privileges and access levels can be stored in a data structure that is different or separate from the data structure that store the system requestor identifiers and the training achievements and/or the data structure that stores the training achievements and the access levels. This allows for easier, faster, and less mistake-prone updating or modifications of the permissions associated with different access levels for the different system requestors. If the privileges were individually assigned to the system requestors, then a change in the privileges for one or more access levels could require the individual updating of the records for the system requestors. For example, in a company employing thousands of system requestors, a change in a single permission or privilege could require the individual modification of the access level for hundreds or thousands of employees.

Instead, the data structures formed by the method 800 allow for a single change to be made to the privileges associated with one or more access levels, which is imparted to the system requestors by way of the system requestor identifiers being associated with the training achievements in one data structure, the training achievements associated with the access levels in another data structure, and the privileges associated with the access levels in another data structure. This can allow for the attributes of access levels to be quickly and easily changed, such as by changing without requiring intervention or involvement of specialized technicians, such as persons of an information technology (IT) staff.

In some embodiments, the privileges and the access levels may be stored with the training achievements in the same data structure. For example, the data structure storing the training achievements with the access levels also may store the privileges associated with the different access levels.

Figure 7:
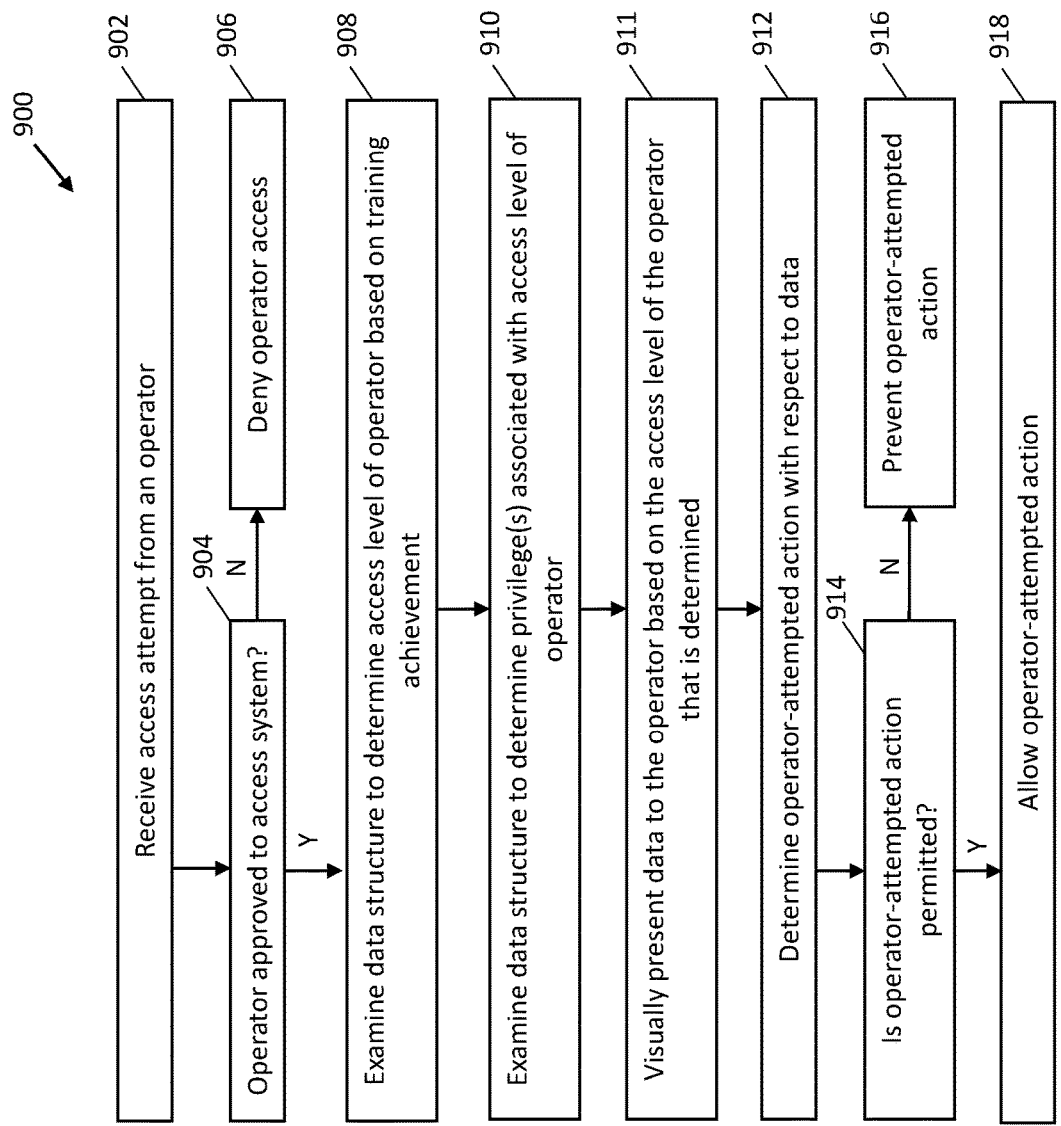
FIG. 7 is an example process flow illustrating a method for controlling access and/or modification to data according to an example embodiment.

FIG. 7 is an example process flow illustrating a method 900 for controlling access and/or modification to data according to an example embodiment. The method 900 may be performed by one or more embodiments of the controller device 200 described above, or another device. At block 902, an access attempt by a system requestor to a system is received. This access attempt may occur by the system requestor providing a login and password credentials, or by providing other identifying information. At decision point 904, a determination is made as to whether the system requestor is approved to access the system. For example, the credentials or other identifying information provided by the system requestor may be compared to a list or other data structure storing credentials or other identifying information of system requestors that are approved to access the system. If the system requestor has not provided approved credentials or identifying information, then the system requestor may be denied access to the system and flow of the method 900 can proceed to block 906. At block 906, the system requestor is denied access to the system. For example, the controller device 200 may not allow the system requestor to view, modify, or otherwise edit the data 118, 120, 122, 124, 126, and/or 128.

But, if the system requestor has provided approved credentials or identifying information, then the system requestor may be allowed to access the system and flow of the method 900 can proceed to block 908.

At block 908, a data structure is examined to determine the access level of the system requestor. As described above, different system requestors can have different access levels based on the training, skills, experience, etc. of the system requestors.

At block 910, a data structure is examined to determine the privilege or privileges associated with the access level of the system requestor. This data structure may list different privileges for viewing, editing, or otherwise modifying various portions of data for different access levels. The data structure may be searched for the access level matching the access level of the system requestor. Once the matching access level is found in the data structure, the privilege or privileges for viewing, editing, and/or modifying data associated with that access level is obtained from the data structure.

At block 911, data is visually presented to a system requestor based on the access level of the system requestor that was determined. The data that is presented to the system requestor can be limited based on the access level of the system requestor. For example, if the access level of the system requestor does not allow the system requestor to view personal identifying information of patients, prescriptions of the patients, etc., then the information shown to the system requestor on a display device does not include the blocked information. Instead, placeholders (e.g., boxes, several X's, etc.) may be shown in place of the information. Other information that the system requestor is allowed to view based on his or her access level can be shown to the system requestor on the display device. For example, addresses of different pharmacies can be shown to the system requestor. Therefore, a system requestor will only be shown the data related to available work in a work queue of the system requestor (when the data is available to the entire workforce) and in which the access level of the system requestor meets the criteria required to process the data (e.g., the system requestor has the correct access level to view or modify the data in his or her work queue).

At block 912, an operator-attempted action (e.g., an action attempted by a system requestor) with respect to at least some data stored by the system and/or shown to the system requestor is determined. This attempted action may be determined based on input provided by the system requestor, based on a type of request or work request that is assigned or attempted to be assigned to the system requestor, or in another manner. The attempted action may be to view a portion of the data 118, 120, 122, 124, 126, and/or 128, to change a portion of the data 118, 120, 122, 124, 126, and/or 128, to erase a portion of the data 118, 120, 122, 124, 126, and/or 128, to review data 118, 120, 122, 124, 126, and/or 128 that was processed or examined by another system requestor, to generate a report from the data 118, 120, 122, 124, 126, and/or 128, or perform another action.

At decision point 914, a determination is made as to whether the operator-attempted action is permitted on one or more subsets of data in the computing system. The operator-attempted action may be permitted when the attempted action matches or is the same as one or more of the privileges associated with the access level of the system requestor. The access level of the system requestor may permit the requestor to view, edit, and/or create data, while other actions are not permitted. The editing of data can include changing existing data, creating new data, removing at least a portion of existing data, and/or a combination of changing, creating, and/or removing data. The portion of data that is viewed, edited, and/or created can be referred to as a subset of data of the computing system.

For example, if the system requestor is assigned a task of a type of request or work request C, but the privileges of the access level of the system requestor do not include the type of request or work request C, then the system requestor is not permitted to perform the task of the type of request or work request C. As a result, flow of the method 900 can proceed to block 916. If the privileges of the access level of the system requestor include the type of request or work request C, however, then the system requestor is permitted to perform the task of the type of request or work request C. As a result, flow of the method 900 can proceed to block 918.

At block 916, the system requestor is not allowed to perform the attempted action. The system requestor may be informed of this denial by a message or other information presented on a display to the system requestor, and the data 118, 120, 122, 124, 126, and/or 128 attempted to be viewed, modified, erased, or reviewed by the system requestor is not displayed, changed, removed, or presented to the system requestor.

At block 918, the system requestor is allowed to perform the attempted action. The system requestor may be allowed to use the benefit manager device 102 to view, modify, erase, or review at least some of the data 118, 120, 122, 124, 126, and/or 128, as limited by the privileges associated with the access level of the system requestor.

With respect to determining which system requestors are to perform the various actions or tasks (e.g., the type of requests or work requests), one or more than one of the embodiments of the systems and methods described herein can balance the workloads of the system requestors to ensure that tasks are assigned to system requestors that are qualified to complete the tasks and that the tasks are assigned to system requestors having sufficient temporal bandwidth to complete the tasks. System requestors may be qualified to complete tasks when the system requestors having access levels with the privileges needed to complete the tasks. System requestors have sufficient temporal bandwidth to complete the tasks when the system requestors have at least as much available time to complete the tasks as the tasks require for completion. For example, in addition to providing a faster and easier methodology for changing access levels of system requestors based on changing skills, training, experience, etc., of the system requestors to control what data the system requestors are allowed access to, one or more embodiments of the inventive subject matter described herein provide for balancing the work tasks assigned to system requestors based on both the system requestors' access levels and available time or bandwidth of the system requestors to complete the work tasks. This balancing can be achieved by restricting which tasks can be assigned to different system requestors. For example, the system will prevent a system requestor having too low of an access level to complete a task from being assigned the task. Similarly, the system will prevent a system requestor having too limited of availability or bandwidth to complete the task from being assigned the task, even if the system requestor has a sufficiently high access level to perform the data processing of the task. The system ensures that any task is assigned to only those system requestors having the access level and bandwidth to complete the task.

Figure 8:
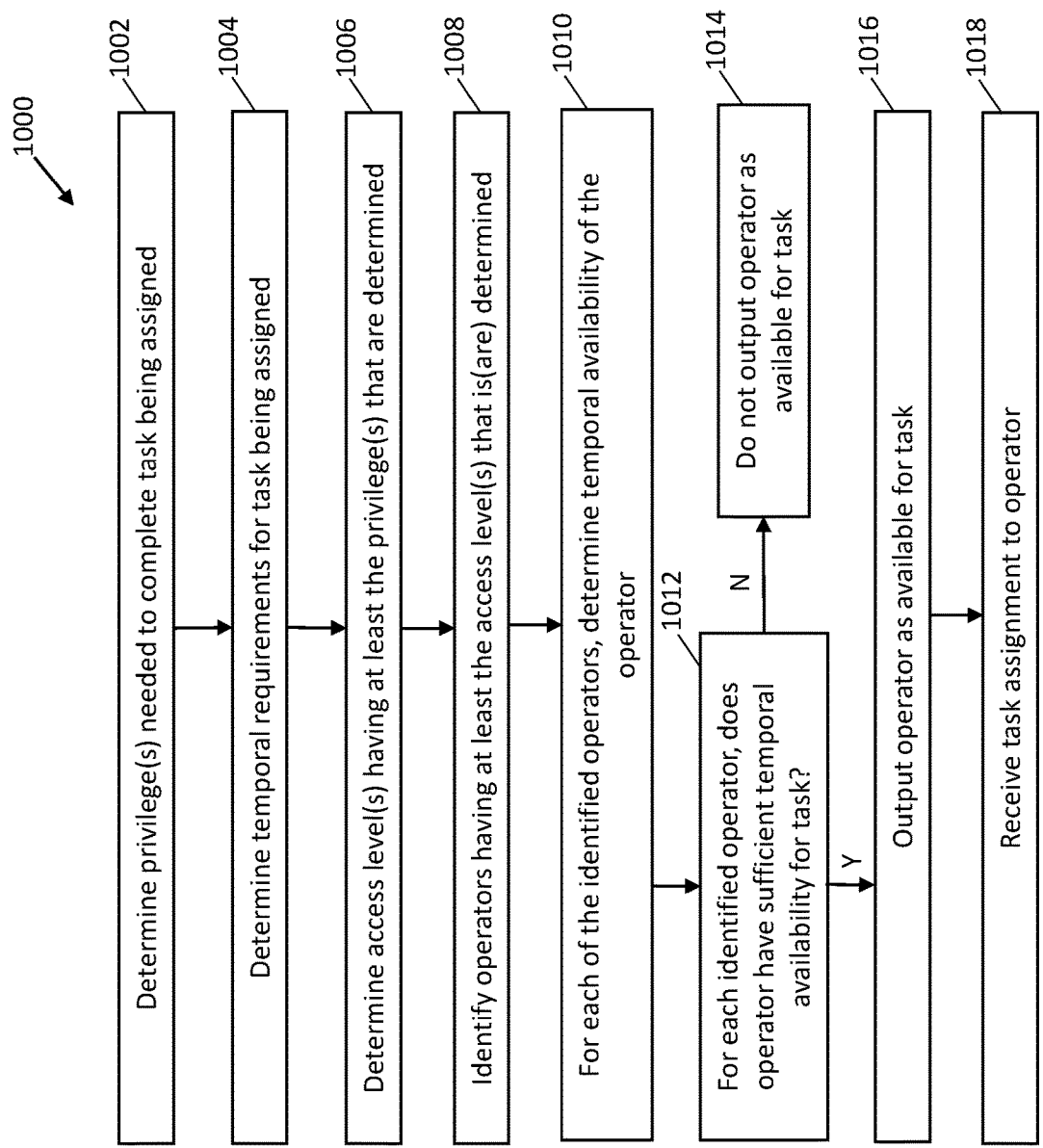
FIG. 8 is an example process flow illustrating a method for workload balancing.
Figure 9:
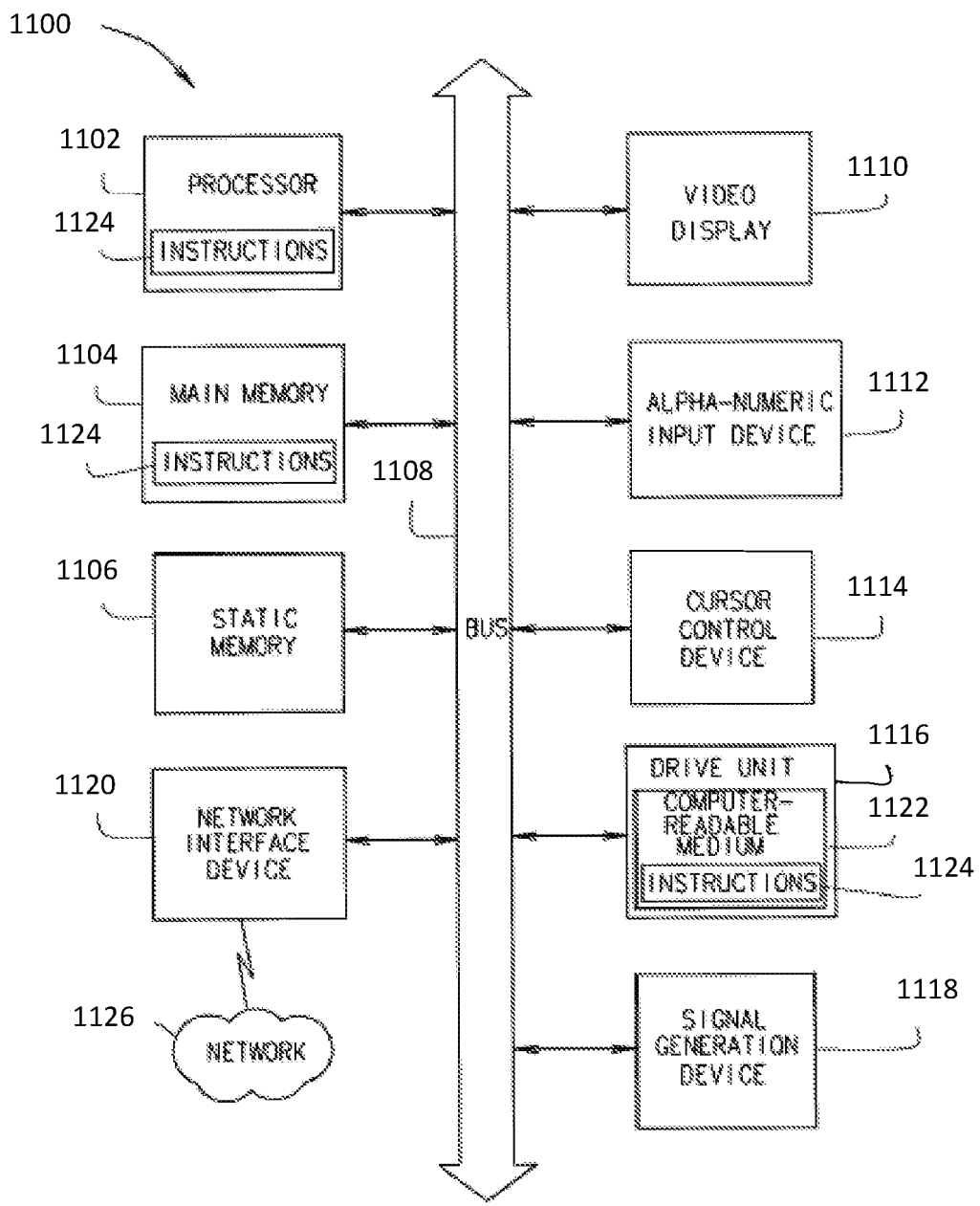
FIG. 9 shows a block diagram of a controller device in the example form of a computer system within which a set of instructions may be executed causing the machine to perform any one or more than one methods, processes, operations, or methodologies discussed herein.

FIG. 8 is an example process flow illustrating a method 1000 for workload balancing. The method 1000 may be performed by one or more the one embodiments of the controller device 200 described above, or another device, to ensure that tasks involving viewing, modifying, etc., the data 118, 120, 122, 124, 126, and/or 128 are assigned to system requestors having the privileges needed to complete the tasks and sufficient available time in which to complete the tasks.

At block 1002, one or more the one privilege needed to complete a task being assigned to one or more system requestors are determined. For example, a first task may involve adding a pharmacy to a list of providers in a network of an insurance plan. To complete this task, a system requestor may need to view and perform a type of request or work request on data A. Therefore, the privileges "View AB" and "Process TOR A" may be needed to complete the task. As another example, a second task may involve restricting the list of medications that a group of pharmacies is permitted to sell in a network of an insurance plan. This second task may require a system requestor to perform types of request or work requests on data A, B, and C to complete the task. Therefore, the privileges "Process TOR A", "Process TOR B", and "Process TOR C" may be needed to complete the task. The privileges needed to complete a task may be stored in a data structure that lists the privileges with or alongside the various tasks. The needed privileges may be determined from this data structure.

At block 1004, temporal requirements for completing the task being assigned are determined. A temporal requirement can be a designated period of time or designated time associated with completing or needed to complete a task. More complex tasks can have longer completion times when compared to simpler tasks. For example, a task involving changing a mailing address of a pharmacy in the storage device 110 can be associated with a designated time period of fifteen minutes, while a task involving creating restrictions on which medications that a pharmacy is allowed to distribute and on the prices that the pharmacy is allowed to charge within designated counties of a state may be associated with a designated time period of several hours. The temporal requirements for the tasks can be stored with the tasks and optionally with the needed privileges for the tasks in the data structure described above. The temporal requirements for an associated task can be changed at any time, such as by a manager or supervisor responsive to the evolving criteria and/or system requestor efficiencies in completing the task.

For example, as a team of system requestors improves in completing the same or similar tasks over time, a manager, supervisor, or other system requestor (having a sufficiently high access level) can decrease the time associated with the task (e.g., from fifteen minutes for completion to ten minutes to completion). This allows for the system to dynamically or fluidly adapt in the assigning of tasks to system requestors as the efficiency and speed in which the system requestors complete tasks improves. Similarly, the system can increase the time associated with a task, such as when a manager, supervisor, or other system requestor discovers that too many errors are occurring with respect to a certain task. The manager, supervisor, or other system requestor can increase the time associated with the task to allow for system requestors to spend additional time on the task and reduce errors that may occur due to the system requestors previously not having enough time to complete the task.

At block 1006, the access level or levels having at least the privileges needed to complete the task being assigned are determined. The access level or levels may be determined by examining the data structure 700 shown in FIG. 5 to determine the required access level or levels for the task. With respect to the preceding example involving assignment of the first task requiring the privileges "View AB" and "Process TOR A," examination of the data structure 700 reveals that access levels three through ten have at least these privileges. With respect to the preceding example involving assignment of the second task requiring the privileges "Process TOR A", "Process TOR B", and "Process TOR C," examination of the data structure 700 reveals that access levels five through ten have at least these privileges.

At block 1008, system requestors having at least the access levels determined for the task being assigned are identified. The data structure 600 shown in FIG. 3 can be examined to determine the training achievement or achievements needed for the access levels determined at block 1006. With respect to the first task associated with access levels three through ten, examination of the data structure 600 reveals that, to have at least access level three, at least training achievement H must be completed. The data structure 201 may then be examined to determine which system requestors have at least the access levels needed for the task being assigned. The data structure 201 indicates that system requestors JRC0627261, EJC0427771, MRR0527876, RLC1324681, and JLL9353456 have the training achievements and access levels needed to complete the first task, with the system requestor CRC1115927 not having the training achievement or access level needed to complete the first task.

With respect to the second task associated with access levels five through ten, examination of the data structure 600 reveals that, to have at least access level five, at least training achievement F must be completed. The data structure 201 may then be examined to determine which system requestors have at least the access levels needed for the task being assigned. The data structure 201 indicates that system requestors EJC0427771, RLC1324681, and JLL9353456 have the training achievements and access levels needed to complete the second task, with the system requestors CRC1115927, JRC0627261, and MRR0526876 not having the training achievement or access level needed to complete the second task.

At block 1010, temporal availabilities of the system requestors are determined. The temporal availabilities are determined for those system requestors identified as having at least the needed access levels for completion of the task being assigned. The temporal availabilities of the system requestors are the times that the system requestors have available for performing additional tasks. The temporal availability of a system requestor can be calculated by subtracting a total amount of time needed for completion of tasks already assigned to the system requestor from a designated time, such as the length of a working day (minus employer provided breaks for lunch, etc.), the length of a working week, or the like. The temporal availabilities and/or tasks already assigned to the system requestors may be stored in a data structure with identifiers of the system requestors, such as in another set of cells in the data structure 500.

In one embodiment, a temporal availability of each system requestor in a plurality of system requestors to complete a task being assigned is determined. The plurality of system requestors can be all operators having any access level to the computing system, can be a set or subset of all operators having any access level to the computing system, can be all operators having at least a minimum access level needed for completion of the task being assigned, can be a set or subset of all operators having at least the minimum access level needed for completion of the task being assigned, can be all operators having the same access level as is needed for completion of the task being assigned, or can be a set or subset of all operators having the same access level that is needed for completion of the task being assigned.

Previous attempts to manage workloads and access levels rely on manual tracking of system requestor efficiencies, system requestor availabilities, trainings completed by the system requestors, skills of the system requestors, and system requestor experiences. This manual tracking can introduce error and can be difficult to accurately control access levels while also balancing workloads of the system requestors based on the access levels of the system requestors.

At decision point 1012, for each system requestor having the access level needed for completion of a task being assigned, a determination is made as to whether that system requestor has sufficient temporal availability for completing the task. A comparison between the designated period of time needed to complete the task being assigned and the temporal availability of each system requestor having the access level needed for completion of the task can be made to make or otherwise complete this determination. In one embodiment, the task being assigned may have or be associated with a deadline for completing the task. The temporal availabilities of the system requestors within this deadline may be compared to the completion time of the task, while temporal availabilities of the system requestors outside (e.g., after or beyond) the deadline may not be examined to determine if the system requestor has sufficient availability to complete the task within the deadline.

In one embodiment, the plurality of system requestors can be ranked based on the temporal availability of each of the system requestors. At least one system requestor may be selected as an assigned system requestor. The assigned system requestor is assigned the task based on a comparison of the designated time needed for completion of the task with the temporal availability of that same system requestor and based on the ranking of the system requestors. For example, first, second, and third system requestors may have longer temporal availabilities than the designated time for a task being assigned. The first system requestor may have the shortest temporal availability, the second system requestor may have the longest temporal availability, and the third system requestor may have a temporal availability between those of the first and third system requestors. The computing system can rank these system requestors in the order of: second system requestor, third system requestor, and first system requestor based on the relative temporal availabilities of the requestors. The system requestor having the longest temporal availability (and the proper access level), that is, the second system requestor, can be selected as an assigned system requestor. The assigned system requestor is the requestor assigned the task to complete. The rankings of the system requestors may be updated, such as after one or more tasks are assigned. The temporal availability of a system requestor will decrease after being assigned a task as the requestor now has less available time to complete other tasks.

The previous manual attempts at tracking workloads and access levels have introduced inefficiencies and errors in determining which system requestors both have the required access level and the availability to perform the task(s) being assigned. For example, the manual tracking of the system requestor access levels and bandwidths can result in some system requestors having higher access levels from being assigned too many tasks. Because these system requestors have the ability to perform most or all tasks, manual attempts at allocating the tasks among all system requestors can result in the higher skilled system requestors being assigned significantly more tasks than lesser skilled system requestors, even though the lesser skilled system requestors may have the proper access level for performing some tasks assigned to the higher skilled system requestors.

If a system requestor does not have sufficient temporal availability to complete the task being assigned, then flow of the method 1000 can proceed to block 1014 for that system requestor. But, if the system requestor has sufficient temporal availability to complete the task being assigned, then flow of the method 1000 can proceed to block 1016 for that system requestor.

At block 1014, the system requestors having insufficient temporal availability to complete the task being assigned are not selected for being output. In contrast, at block 1016, the system requestors having sufficient temporal availability to complete the task being assigned are selected for being output. The system requestors may be output by displaying a list, table, or other arrangement of the system requestors having sufficient temporal availability to complete the task on a display device. For example, a list, drop down menu, or other display listing the system requestors having both sufficient access levels and availabilities to perform the task may be shown on a display device. The system requestors may be listed in an order representative of the temporal availabilities of the system requestors, such as with the system requestors having more temporal availabilities listed before (e.g., above) system requestors having less temporal availability. In some embodiments, a grid or other arrangement may be used showing the system requestors having sufficient access levels to perform the task, with the temporal availabilities for each system requestor on each of several upcoming days shown next to the system requestor.

At block 1018, an assignment of the task to a system requestor is received. The assignment may be received based on user input received from a system requestor. For example, the system requestor may use an input device (e.g., an electronic mouse, touchpad, stylus, or the like) to select a system requestor to assign the task to from the output listing the system requestors having both sufficient access levels and sufficient temporal availabilities to complete the task. Responsive to the task being assigned to a system requestor, the temporal availability of the system requestor may be adjusted by subtracting the designated time for completing the task from the temporal availability of the system requestor. The task assignment and/or the updated temporal availability of the system requestor may be saved or recorded, such as in the data structure 500 shown in FIG. 3.

The method 1000 provides for assignment of tasks to the system requestors that balances the distribution of tasks among the system requestors. By not presenting system requestors having insufficient time or training to complete the task, the method 1000 assigns tasks to system requestors having both the training and the time available to complete the tasks. In some embodiments, such assignment improves operation of and/or operations performed on the system 100.

FIG. 10 shows a block diagram of a controller device 200 (shown in FIG. 2) in the example form of a computer system 1100 within which a set of instructions may be executed causing the machine to perform any one or more than one methods, processes, operations, or methodologies discussed herein. The devices 102, 108, 206-230, for example, may include the functionality of the one or more than one computer systems 1100. These devices and systems are dedicated to performing any one or more than one methods, processes, operations, or methodologies discussed herein.

In an example embodiment, the machine operates as a standalone device or may be connected (e.g., networked, etc.) to other machines. In a networked deployment, the machine may operate in the capacity of a server or a client machine in server-client network environment, or as a peer machine in a peer-to-peer (or distributed) network environment.

The example computer system 1100 includes one or more processors 1102 (e.g., a central processing unit (CPU), a graphics processing unit (GPU) or both, etc.), a main memory 1104 and a static memory 1106, which communicate with each other via a bus 1108. The computer system 1100 further includes a video display unit 1110 (e.g., a liquid crystal display (LCD) or a cathode ray tube (CRT), etc.). The computer system 1100 also includes an alphanumeric input device 1112 (e.g., a keyboard, etc.), a cursor control device 1114 (e.g., a mouse, etc.), a drive unit 1116, a signal generation device 1118 (e.g., a speaker, etc.) and a network interface device 1120.

The drive unit 1116 includes a computer readable medium 1122 on which is stored one or more than one sets of instructions 1124 (e.g., software, etc.) embodying any one or more than one methodologies or functions described herein. The instructions 1124 may also reside, completely or at least partially, within the main memory 1104 and/or within the processor 1102 during execution thereof by the computer system 1100, the main memory 1104 and the processor 1102 also constituting non-transitory computer readable media. When loaded with the instructions 1124, the processor 1102 is a machine dedicated to only the present processes and methodologies.

The instructions 1124 may further be transmitted or received over a network 1126 via the network interface device 1120.

While the computer-readable medium 1122 is shown in an example embodiment to be a single medium, the term "computer-readable medium" should be taken to include a single medium or multiple media (e.g., a centralized or distributed database, and/or associated caches and servers, etc.) that store the one or more than one sets of instructions. The term "computer-readable medium" shall also be taken to include any medium that is capable of storing or encoding a set of instructions for execution by the machine and that cause the machine to perform any one or more than one methodologies of the present invention. The term "Computer-readable medium" shall accordingly be taken to include, but not be limited to, solid-state memories, and optical media, and magnetic media. In some embodiments, the computer-readable medium is a non-transitory computer-readable medium. In other examples, a computer-readable medium is any medium that satisfies statutory requirements and stores instructions for use by a machine.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The embodiments of the present disclosure generally provide for a plurality of circuits or other electrical devices, which can be used in units, modules, systems, and sub-systems and the like. All references to such and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical/operational implementation that is desired. It is recognized that any circuit or other electrical device disclosed herein may include any number of microprocessors, discrete circuit components, integrated circuits, memory devices (e.g., FLASH, random access memory (RAM), read only memory (ROM), electrically programmable read only memory (EPROM), electrically erasable programmable read only memory (EEPROM), or other suitable variants thereof, etc.) and instructions (e.g., software, etc.) which co-act with one another to perform operation(s) disclosed herein. In addition, any one or more than one electric devices may be configured to execute a computer-program that is embodied in a computer readable medium that is programmed to perform any number of the functions and features as disclosed. The computer readable medium may be non-transitory or in any form readable by a machine or electrical component.

The inventive subject matter may be represented in a variety of different embodiments of which there are many possible permutations.

In an example embodiment, a method includes configuring one or more memories of a computer system according to a logical data structure having plural records. A first set of the records includes cells that identify different system requestors and training achievements associated with the different system requestors. A second set of the records includes cells that indicate different levels of data access associated with the training achievements. The one or more memories are configured to be queried to determine whether to grant access to a system requestor to at least some information stored in the one or more computer memories according to the level of data access associated with the training achievement of the system requestor.

In another example embodiment, a system includes one or more processors configured to arrange one or more memories of a computer system according to a logical data structure having plural records. A first set of the records includes cells that identify different system requestors and training achievements associated with the different system requestors. A second set of the records includes cells that indicate different levels of data access associated with the training achievements. The one or more memories are configured by the one or more processors to be queried to determine whether to grant access to a system requestor to at least some information stored in the one or more computer memories according to the level of data access associated with the training achievement of the system requestor.

In another example embodiment, a method includes determining a training achievement of a system requestor attempting to access one or more computer memories storing information. The training achievement is representative of one or more of a type or an amount of training performed by the system requestor. The method also includes determining a level of data access associated with the training achievement of the system requestor. The level of data access is within a range of levels of data access that dictate different extents to which the information stored in the one or more computer memories can be edited. The method also includes granting access to the system requestor to at least some of the information stored on the one or more computer memories according to the level of data access associated with the training achievement of the system requestor.

Thus, methods and systems for data access control to data have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks may be shown in the flowcharts, the methods may be performed continuously.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more than one steps within a method may be executed in different order (or concurrently) without altering the principles of the present disclosure. Further, although each of the embodiments is described above as having certain features, any one or more than one of those features described with respect to any embodiment of the disclosure can be implemented in and/or combined with features of any of the other embodiments, even if that combination is not explicitly described. In other words, the described embodiments are not mutually exclusive, and permutations of one or more than one embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more than one intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more than one interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuitry that, in combination with additional processor circuits, executes some or all code from one or more than one modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more than one modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more than one particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more than one operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method comprising:
Determining training achievements of system requestors attempting to access one or more computer memories storing information, the training achievement represents one or more types of training or an amount of training performed by the system requestor;
determining data access levels corresponding to the training achievements of the system requestors and corresponding to different training achievements, the data access levels dictating different operations on the information stored in the one or more computer memories;
determining whether to grant access to the system requestors to the information stored on the one or more computer memories according to the data access levels associated with the training achievements of the system requestors;
determining a designated time needed for completing a task and a deadline for completing the task being assigned to at least one of the system requestors;
determining temporal availabilities of the system requestors to complete the task before the deadline;
ranking the system requestors based on the temporal availabilities of the system requestors, the system requestors ranked such that the system requestors having more temporal availabilities within the deadline are ranked higher than the system requestors having less temporal availabilities within the deadline; and
selecting an assigned system requestor to the task based on a comparison of the designated time of the task with the temporal availability and the ranking of the system requestors.

2. The method of claim 1, further comprising:
updating the temporal availability of the assigned system requestor; and
re-ranking the system requestors based on the updated temporal availability.

3. The method of claim 1, further comprising changing the training achievement of a first system requestor of the system requestors responsive to the first system requestor completing one or more additional training exercises.

4. The method of claim 1, wherein the data access levels are associated with different permissible edits to the information stored in the one or more computer memories.

5. The method of claim 1, wherein a first level of the data access levels allows the system requestors to view the information stored in the one or more computer memories without modifying the information stored in the one or more computer memories.

6. The method of claim 5, wherein a different, second level of the data access levels allows the system requestors to view and modify a first portion of the information stored in the one or more computer memories.

7. The method of claim 6, wherein a different, third level of the data access levels allows the system requestors to view and modify a larger, second portion of the information stored in the one or more computer memories.

8. The method of claim 1, wherein at least one of the levels of the data access levels allows the system requestors to review modifications of the information performed by one or more other system requestors.

9. The method of claim 1, further comprising changing the data access levels that correspond to one or more of the training achievements.

10. A tangible and non-transitory computer-readable storage medium comprising a plurality of instructions that direct at least one processor to:
determine training achievements of system requestors attempting to access one or more computer memories storing information, the training achievement represents one or more types of training or an amount of training performed by the system requestor;
determine data access levels corresponding to the training achievements of the system requestors and corresponding to different training achievements, the data access levels dictating different operations on the information stored in the one or more computer memories;
determine whether to grant access to the system requestors to the information stored on the one or more computer memories according to the data access levels associated with the training achievements of the system requestors;
determine a designated time needed for completing a task and a deadline for completing the task being assigned to at least one of the system requestors;
determine temporal availabilities of the system requestors to complete the task before the deadline;
rank the system requestors based on the temporal availabilities of the system requestors, the system requestors ranked such that the system requestors having more temporal availabilities within the deadline are ranked higher than the system requestors having less temporal availabilities within the deadline; and
select an assigned system requestor to the task based on a comparison of the designated time of the task with the temporal availability and the ranking of the system requestors.

11. The tangible and non-transitory computer-readable storage medium of claim 10, wherein the plurality of instructions direct the at least one processor to:
update the temporal availability of the assigned system requestor; and
re-rank the system requestors based on the updated temporal availability.

12. The tangible and non-transitory computer-readable storage medium of claim 10, wherein the plurality of instructions direct the at least one processor to change the training achievement of a first system requestor of the system requestors responsive to the first system requestor completing one or more additional training exercises.

13. The tangible and non-transitory computer-readable storage medium of claim 10, wherein the data access levels are associated with different permissible edits to the information stored in the one or more computer memories.

14. The tangible and non-transitory computer-readable storage medium of claim 10, wherein a first level of the data access levels allows the system requestors to view the information stored in the one or more computer memories without modifying the information stored in the one or more computer memories.

15. The tangible and non-transitory computer-readable storage medium of claim 10, wherein a different, second level of the data access levels allows the system requestors to view and modify a first portion of the information stored in the one or more computer memories.

16. The tangible and non-transitory computer-readable storage medium of claim 15, wherein a different, third level of the data access levels allows the system requestors to view and modify a larger, second portion of the information stored in the one or more computer memories.

17. The tangible and non-transitory computer-readable storage medium of claim 10, wherein at least one of the levels of the data access levels allows the system requestors to review modifications of the information performed by one or more other system requestors.

18. The tangible and non-transitory computer-readable storage medium of claim 10, wherein the plurality of instructions direct the at least one processor to change the data access levels that correspond to one or more of the training achievements.

* * * * *